United States Patent [19]
Yang

[11] Patent Number: 5,464,710
[45] Date of Patent: Nov. 7, 1995

[54] ENHANCEMENT OF OPTICALLY VARIABLE IMAGES

[75] Inventor: Peter Y. Yang, San Diego, Calif.

[73] Assignee: Deposition Technologies, Inc., San Diego, Calif.

[21] Appl. No.: 165,376

[22] Filed: Dec. 10, 1993

[51] Int. Cl.⁶ .............................. G03H 1/04; B32B 31/18
[52] U.S. Cl. ................... 430/1; 430/2; 359/1; 359/3; 204/298.02; 204/192.14; 204/192.27; 204/297.24; 204/297.25
[58] Field of Search ..................... 359/1, 3; 430/1, 430/2, 321; 204/298.02, 192.14, 192.27, 298.24, 298.25

[56] References Cited

U.S. PATENT DOCUMENTS

| | | | |
|---|---|---|---|
| 3,720,541 | 3/1973 | King | 204/192 |
| 4,234,654 | 11/1980 | Yatabe et al. | 428/333 |
| 4,315,665 | 2/1982 | Haines | 350/3.61 |
| 4,320,169 | 3/1982 | Yatabe et al. | 428/472 |
| 4,322,276 | 3/1982 | Meckel et al. | 204/298.24 |
| 4,374,717 | 2/1983 | Drauglis et al. | 204/192.14 |
| 4,414,254 | 11/1983 | Iwata et al. | 428/34 |
| 4,510,190 | 4/1985 | Glaser | 428/24 |
| 4,709,363 | 11/1987 | Dirks et al. | 430/495 |
| 4,710,426 | 12/1987 | Stephens | 428/336 |
| 4,840,444 | 6/1989 | Hewitt | 350/3.85 |
| 4,842,893 | 6/1989 | Yializis et al. | 427/44 |
| 4,856,857 | 8/1989 | Takeuchi et al. | 350/3.6 |
| 4,906,315 | 3/1990 | McGrew | 156/231 |
| 4,913,858 | 4/1990 | Miekka et al. | 264/1.3 |
| 4,933,120 | 6/1990 | D'Amato et al. | 264/13 |
| 4,973,113 | 11/1990 | Harrington et al. | 350/3.65 |
| 5,035,945 | 7/1991 | Hart | 428/323 |
| 5,044,707 | 9/1991 | Mallik | 359/2 |
| 5,085,514 | 2/1992 | Mallik et al. | 359/2 |
| 5,087,510 | 2/1992 | Tokas et al. | 428/209 |

FOREIGN PATENT DOCUMENTS

| | | | |
|---|---|---|---|
| 0363093 | 4/1990 | European Pat. Off. | 204/192.27 |
| 1168641 | 10/1969 | United Kingdom . | |
| 8910430 | 11/1989 | WIPO | 204/298.24 |

OTHER PUBLICATIONS

Vapor Deposition Processes Chapter 24 (1976).

*Primary Examiner*—Charles L. Bowers, Jr.
*Assistant Examiner*—Martin J. Angebranndt
*Attorney, Agent, or Firm*—Juettner Pyle Lloyd & Piontek

[57] ABSTRACT

The optically variable image in optically variable imaging devices, such as holograms, kinegrams, pixelgrams and interference gratings, is enhanced by coating the image relief or interference pattern with a thin film of a synthesized high oxygen content oxide of bismuth wherein the atomic ratio of oxygen to bismuth is 1.7 or greater, i.e., $BiO_x$ ($x => 1.7$).

A process for applying a thin film of the synthesized high oxygen content $BiO_x$ to the relief or interference pattern comprises reactive deposition of bismuth in an oxygen partial pressure atmosphere wherein the oxygen partial pressure and the dynamic deposition rate are correlated to achieve the desired degree of oxidation of the bismuth.

The process also lends itself to dynamic deposition of other image enhancing materials, as well as protective coatings for the image enhancing materials.

15 Claims, 6 Drawing Sheets

ENHANCEMENT OF OPTICALLY VARIABLE IMAGES

FIELD OF THE INVENTION

The present invention relates to enhancement of the image in optically variable image devices, i.e., holograms, kinegrams, pixelgrams, interference gratings and the like.

BACKGROUND

Optically variable image devices currently include holograms, kinegrams, pixelgrams and interference gratings (e.g., variable and minutely spaced parallel lines). Because holograms are the better known of such devices, the description herein will refer primarily to holograms and holographic images. However, it is to be understood that the present invention is not limited in its application to holograms, but is broadly applicable to all such optically variable image devices.

Since Dennis Gabor of Great Britain introduced holography in 1948, and Yuri N. Denisyuk of Russia produced reflective holograms in 1962, holograms and other optically variable image devices have found applications in a variety of areas. In response to security application demand, intensive research and development have been devoted to commercial mass production of reflective holograms by embossing or casting and curing a relief pattern onto a transparent polymer substrate, such as polyester, polyvinyl chloride and acrylate polymers, to provide the interference pattern required for a holographic image. The most recent developments are represented by U.S. Pat. Nos. 5,085,514, 4,973,113, 4,933,120 and 4,913,858. By illuminating the interference pattern on the substrate, the film will reconstruct and display the holographic image at one or more angles of observation.

One important security application is to laminate semi-transparent reflective holograms onto security documents, such as credit cards and identification badges, so that the document can be read through the hologram and the holographic image provides security advice for the document. Due to the optically variable characteristic of the holographic image, the document cannot be photocopied or counterfeited since the holographic image cannot be photographically reproduced. Likewise, the document cannot be altered because any attempt to remove the hologram bearing layer will result in destruction of the holographic image. Thus the protected document enjoys a high level of security.

In order to protect the image-carrying relief pattern on the substrate and to laminate the hologram onto documents, the image bearing surface has to be coated or laminated by means of a transparent substance. Unfortunately, direct coating or laminating of a transparent polymer with an adhesive will almost totally erase an unprotected or nonenhanced holographic image due to the fact that most visually transparent polymers and resins have an optical constant in the range of 1.45 to 1.65.

Optical science indicates that this problem can be overcome by applying a substantially transparent dielectric or semiconductor layer with high reflective index, and appropriate thickness, on the holographic relief pattern to obtain the visual holographic image in reflection. Optical science also indicates that a thin metal layer can be semitransparent and still enhance the reflection, but with lower quality in comparison with dielectric and semiconductor layers. For a given level of reflectivity, metals are too absorptive for transparent or semitransparent applications. However, metal layers are useful for high absorbency low transmission applications. See for example U.S. Pat. Nos. 4,315,665 and 4,840,444 which utilize highly absorbing metal coatings on holographic images for use in low transmittance applications, such as sunglasses and solar control window films.

U.S. Pat. No. 4,856,857 is directed to a transparent hologram comprising a transparent substrate bearing a holographic interference relief pattern, and a thin image enhancing film applied to and following the form of the relief pattern and having an index of refraction different from that of the substrate by more than 0.2, and preferably about 1.0 or more. The thin image enhancing film may be applied by vapor deposition and in other manners, and is said to be applied to a thickness not exceeding 200 angstroms. The thin film may be selected from a broad range of materials listed in the patent, including inter alia, aluminum, silver, copper, titanium oxide ($TiO_2$), zinc oxide (ZnO), and bismuth oxide ($Bi_2O_3$).

As above noted, the use of reflective metals such as aluminum, even when applied in extremely thin layers, has not met with wide spread acceptance for transparent holographic applications because of the absorbency of the metal. Zinc oxide and titanium oxide, and niobium oxide as well, have proven useful as image enhancers. However, zinc oxide, especially when laminated to a base card, cuts down on image visibility and sharpness and produces a product of low quality. Niobium oxide and titanium oxide produce a better product, but the production rate is slow and excessively costly. Little use appears to have been made of $Bi_2O_3$, because of low transmittance and high absorbency at wavelengths less than 600 nanometers.

In commercial practice today, a more successful alternative appears to be the process represented by U.S. Pat. No. 5,044,707, which utilizes a metallization/demetallization technique. The process involves an environmentally unfriendly chemical etching process, and results in a limited yield. The image produced is grayish, which is not favorable. Another alternative appears in U.S. Pat. No. 5,087,510, which proposes an electrolessly deposited thin metal film for mass production of image enhanced reflective holograms. Again, the process involves environmentally unfriendly aspects and results in limited yield. Moreover, the absorption of the metal layer makes the production of a top quality, clear, reflective hologram inherently improbable.

SUMMARY OF THE INVENTION

In contrast to all of the above suggestions, the present invention reveals that the use of synthesized high oxygen content oxides of bismuth ($BiO_x$) produces semi-transparent reflective holograms of excellent quality and outstanding performance.

The primary aspect of the present invention resides in the discovery that when bismuth is sputtered reactively with oxygen in a controlled oxygen partial pressure atmosphere, such that the atomic ratio of the oxygen to the bismuth in the film deposited on a holographic image is 1.7 or greater, i.e., $BiO_x$ (x => 1.7), the holographic image is greatly enhanced and, at the same time, substantially transparent.

The reactively sputtered, synthesized $BiO_x$ (x => 1.7) film has limited absorption but a high optical refractive index of 2.5 to 2.7 in the visible spectrum, which is comparable to titanium oxide ($TiO_2$), and substantially higher than other visually transparent materials. An optically variable image pattern when coated with the synthesized $BiO_x$ of the invention will retain a bright image and substantial transparency when laminated to a base material, such as a credit card or other document. Image brightness is two to three times greater than provided by other oxides.

The high reflectivity and low absorption of the synthesized $BiO_x$ films of the invention are unexpected and could not have been anticipated.

The invention also reveals that by manipulating the film thickness and the atomic ratio, i.e., the extent of oxidation, the appearance of a hologram can be varied from grayish and absorbing, to natural, bright and transparent, to light golden yellow.

The invention further reveals that the dynamic deposition rate of the synthesized $BiO_x$ is far greater than that of titanium oxide and niobium oxide, thereby providing a holographic product of high quality that can be mass produced easily, quickly and economically.

In a preferred embodiment, the semitransparent reflective holograms of the invention can be prepared by (a) forming a polymer substrate having a holographic relief pattern surface, and (b) reactively depositing onto the patterned surface a 20 to 90 nanometer (nm) layer of $BiO_x$ ($x=>1.7$) which conforms to and duplicates the relief pattern. The patterned substrate may be formed by embossing, or by casting and curing a cross linked polymer against a holographic relief pattern mold as described, for example, in U.S. Pat. Nos. 4,906,315 and 5,085,514. Alternatively, the relief pattern can be formed on a $BiO_x$ ($x=>1.7$) coated substrate, such as used for the formation of kinegrams.

When laminating the optically variable image device of the invention onto a base document, the document surface or the image bearing film surface can be dyed, or alternatively, a thin $BiO_x$ ($x<1.7$) or other absorptive layer can be coated onto the information bearing surface of the document for a more aesthetically pleasing result.

A second object of the invention resides in the provision of a process for efficiently and economically applying $BiO_x$ ($x=>1.7$) coatings to holographic substrates.

In accordance with the invention, the synthesized $BiO_x$ coatings of the invention are applied to the holographic relief or interference pattern on a transparent substrate in such manner as to carefully preserve the integrity and character of the holographic pattern, and yet maintain economically acceptable rates of production.

Holographic patterns are frequently of a very delicate nature and embossed or otherwise formed on a thin substrate having low tolerance for the heat generated in a reactive process, especially reactive magnetron cathode sputter deposition of coating materials. In order to accomodate the substrate and pattern limitations, the invention provides a process wherein the synthesized $BiO_x$ coating is applied in a plurality of steps or stages, each of relatively modest intensity, and the substrate is continuously moved and simultaneously cooled as it passes through the several deposition stations. Thus, the substrate is not subjected to thermal conditions that would impair the holographic image. The high dynamic deposition rate of synthesized $BiO_x$ aids in accomplishment of these goals and at the same time facilitates economic mass production of visually-enhanced reflective holograms.

The process of the invention also facilitates the efficient and economical application of a protective resin coating below or above, or both below and above, the reflective coating.

The process of the invention is therefore well adapted to the application to holographic relief patterns of coatings of the absorbing type for use in sunglasses and solar films, as well as coatings of the transparent type for use in document security and like applications.

The invention thus provides greatly improved and visually enhanced optically variable image devices and a process for the efficient and economical mass production of such devices.

These and other objects and advantages of the invention will become apparent from the following detailed description, as considered in conjunction with the accompanying drawings.

DETAILED DESCRIPTION

The following is a detailed description of preferred embodiments of the invention presently deemed by the inventor to be the best mode of carrying out his invention.

Figure 1:
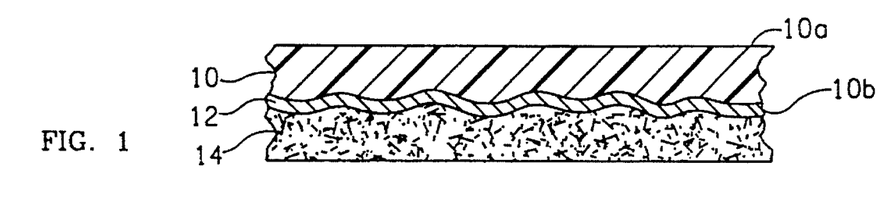
FIG. 1 is a schematic representation, in cross-section and on a greatly magnified scale, of an optically variable image device comprised of a transparent substrate bearing visually enhanced optically variable images and prepared for lamination to a selected base material.

FIG. 1 illustrates in cross section, on a greatly magnified scale, an optically variable image device prepared for application to a selected base material. The device is comprised of a transparent polymer substrate 10 having an optical smooth top surface 10a and bearing on its lower surface a holographic interference or relief pattern 10b. A thin layer 12 of an image enhancing material is applied to and substantially duplicates the holographic pattern. A layer 14 of adhesive covers the layer 12 for protecting the hologram and for laminating the optically variable image device to a base material. The holographic image may comprise a decorative pattern for use in packaging and like applications or it may comprise an emblem and/or code for security and similar applications. The adhesive layer may, of course, be protected by a release sheet (not shown) pending application of the optically variable image device to a base material.

Figure 2:
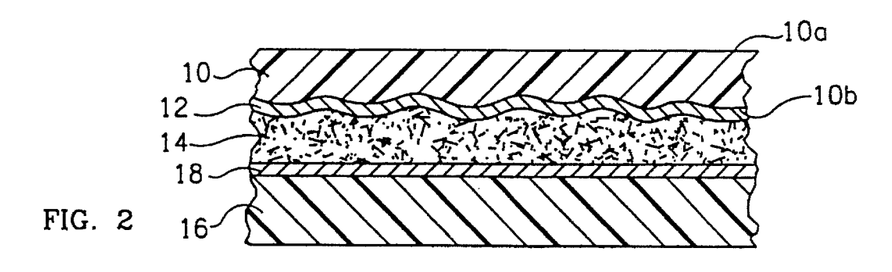
FIG. 2 is a similar schematic representation of a composite structure comprised of a document secured with the optically variable image device of FIG. 1.

In FIG. 2, the optically variable image device of FIG. 1 is shown affixed to a base material, such as a polymeric credit card or identification badge 16 having identifying data 18, such as lettering, printing and/or a photograph, on its upper surface, i.e., the surface to which the optically variable image device is laminated by means of the adhesive layer 14. In the resultant composite structure, the optically variable holographic device must be sufficiently transparent that the identifying data 18 on the card 16 will be visually apparent and legible, i.e., readable to the human eye. At the same time, the optically variable image or hologram must be legibly observable at one or more holographically selected angles of illumination to insure the legitimacy and integrity of the composite structure and the underlying document.

In many prior art applications, these conflicting requirements were satisfied to a degree by application of the hologram solely to an otherwise blank space on the document. This system requires careful registration of the image with the card, which slows production and increases cost. Also, the underlying document, while secured to a degree, was not fully secured over its entire surface.

In an effort to resolve the problem, the image enhancing layer 12 has been provided to reproduce the optically variable image in reflection so as to render the same more readily observable while still maintaining a reasonable degree of transparency. As a general rule, it may be stated that the higher the reflectance of the layer 12, the brighter and sharper the holographic image upon illumination; but the higher the reflectance, the lower the transparency. This has resulted in a compromise, typically a less than happy compromise, between image visibility and document legibility; the more legible the document, the less observable the holographic image and vice-versa. The compromise dictates the use of semitransparent, semireflective holograms.

Figure 5:
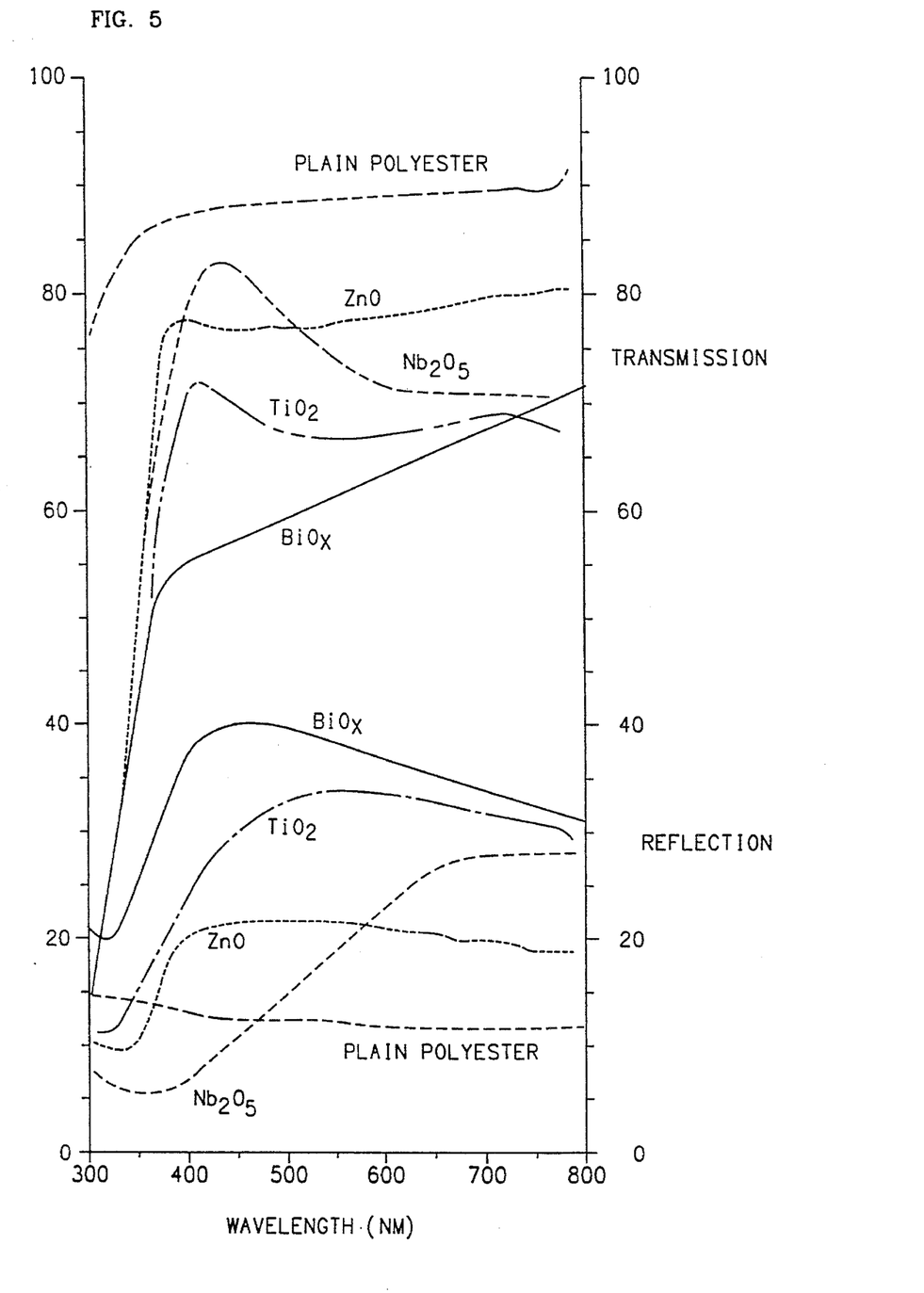
FIG. 5 comprises a graphic representation of characteristic transmission and reflection spectra for plain polyester film and plain polyester films sputter coated with zinc oxide (ZnO), titanium oxide ($TiO_2$), niobium oxide ($Nb_2O_5$), and synthesized $BiO_x$ ($x=>1.7$) deposited in accordance with the invention.

Materials that have heretofore been used for the image enhancing layer in semitransparent reflective holograms are principally zinc oxide (ZnO), titanium oxide ($TiO_2$) and niobium oxide ($Nb_2O_5$). FIG. 5 illustrates graphically the transmission and reflection characteristics within the visual spectrum of 400–800 nanometers (nm) of plain uncoated polyester film, and plain polyester films coated with thin layers of ZnO, $TiO_2$, $Nb_2O_5$ and $BiO_x$ (x=>1.7), respectively. As shown, ZnO coated film has high visual transmission but very low reflection, only about 20%. Consequently, an optically variable image coated with ZnO is very dim, grayish and difficult to see. $Nb_2O_5$ has only slightly better reflection, i.e., about 25%. $TiO_2$ provides a better compromise, with a transmission of about 70% and a reflection of about 30%. However, deposition of $TiO_2$ onto a substrate is a very slow and tedious process and the resultant product is very expensive. Economies of production have thus dictated use of ZnO, even though the holographic image quality is significantly less than desired.

Bismuth oxide, $Bi_2O_3$, though referenced in the literature, is highly absorbing in the visible spectrum and has not found application in the commercial market.

The present invention resides in and is predicated upon the discovery that formation of a synthesized $BiO_x$ having a high level of oxidation (x=>1.7) produces a thin film that is highly reflective and transmissive, that is not highly absorbing, and that provides an excellent compromise between transmission and reflection for use in holographic image enhancement. The higher reflectivity and lower absorption of these films are unexpected and could not have been anticipated.

Figure 6:
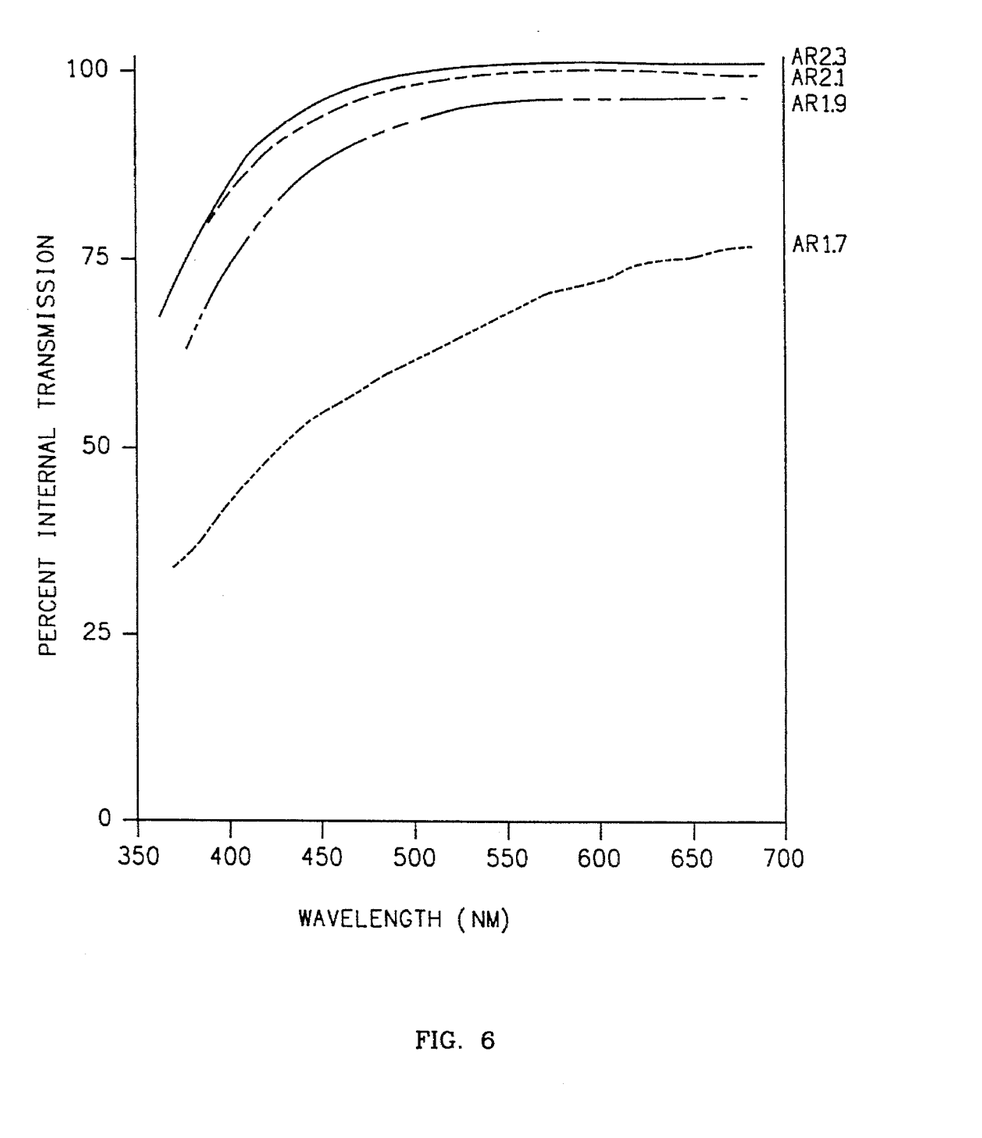
FIG. 6 is a graphic representation of the internal transmission factors for 40 nanometer thin films of synthesized $BiO_x$ deposited on a substrate at different atomic ratios.

FIG. 6 illustrates graphically the internal transmission factors for polyester substrates coated with 40 nm (400 Å) films of a number of synthesized $BiO_x$ compositions, specifically compositions wherein the atomic ratio of oxygen to bismuth is 2.3, 2.1, 1.9 and 1.7. As will be noted from the curve for the sample wherein the atomic ratio is 1.7, the absorption of the coated film increases dramatically as a decrease in the atomic ratio approaches 1.7 and less. This explains why bismuth oxide, $Bi_2O_3$, which has an oxygen to bismuth ratio of 1.5, has been found unacceptable for holographic image enhancement. On the other hand, when the extent of oxidation of bismuth equals or exceeds 1.7, absorption decreases and transmission increases significantly.

Consequently, as shown in FIG. 5, polyester substrates coated with synthesized oxides of bismuth, wherein the atomic ratio of oxygen to bismuth is 1.7 or greater, i.e., $BiO_x$ (x=>1.7), provide a very high level of reflection, about 40%, and an entirely acceptable level of transmission, in the range of 55 to 70%, within the visual spectrum of 400–700 nm. The resultant compromise between transmission and reflection provides excellent holographic image enhancement while maintaining high visibility of the underlying document.

Moreover, the synthesized high oxygen content oxides of bismuth of the invention can be reactively deposited onto a substrate very efficiently and economically to produce a product meeting both the performance standards and cost effectiveness desired by the industry. In particular, the deposition rate of $BiO_x$ (x=>1.7) is 25 or more times faster than that of $TiO_2$, thereby eliminating the economic impediment of $TiO_2$ and producing a better performing and more acceptable product.

Deposition of the $BiO_x$ film may be accomplished by reactive sputter deposition, actuated reactive evaporation deposition and vacuum arcing deposition. The examples herein described were produced by reactive sputter deposition, which is presently preferred.

The thickness of the synthesized $BiO_x$ film of the invention may be varied from about 20 to about 90 nm (200–900 Å) depending upon the performance characteristics desired. The recommended thickness range is from 30 to 80 nm, and most preferably 35–60 nm. Generally speaking, the brightness of the optically variable image will increase as film thickness increases but so will the deposition time and therefore the cost. The rate of production will generally vary from about 20 feet per minute (fpm) for thicker films up to about 50 fpm for thinner films. Preferably, the optical thickness of the film should be about one-quarter wave length of the color or appearance desired. For most applications, a film thickness of about 40 nm applied at a substrate speed of about 50 fpm will produce a very acceptable product.

However, the thickness and characteristics of the substrate must also be taken into consideration. Sputter deposition produces heat. Excessive heating of the substrate, which could melt or otherwise impair or destroy the interference or relief pattern on the substrate, must be avoided so as to maintain the integrity, identity and character of the optically variable image. Thus, provisions must be incorporated within the production process for cooling the substrate and/or otherwise preventing excessive heating of the substrate.

Figure 7:
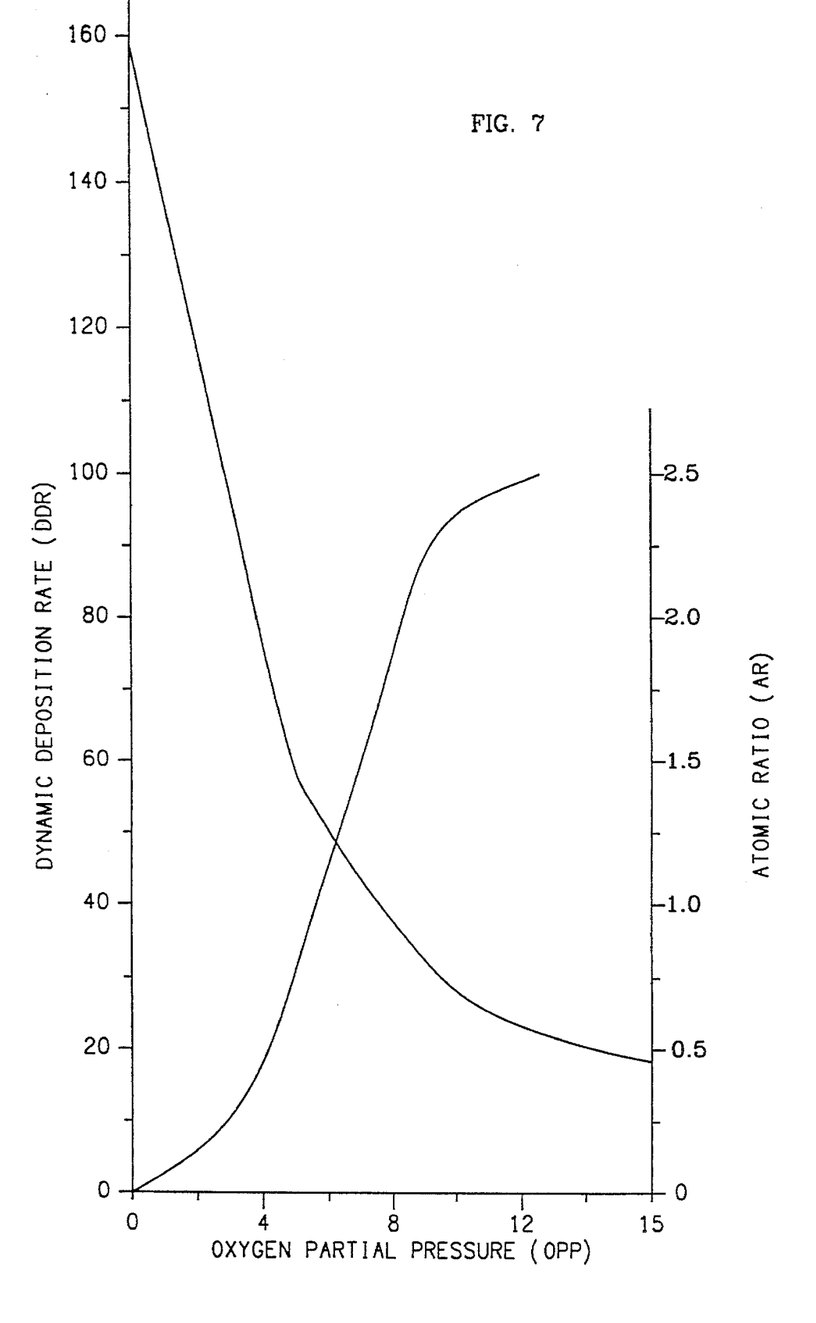
FIG. 7 is a graphic illustration correlating the dynamic deposition rates and the atomic ratios of high oxygen content oxides of bismuth at progressively increasing oxygen partial pressures for the reactive sputtering of bismuth.

The desired extent of oxidation of the bismuth will also enter into the production equation. FIG. 7 comprises a graphic correlation of the rate of reactive sputter deposition of synthesized oxides of bismuth, $BiO_x$, the atomic ratio of oxygen to bismuth in the oxide, and the oxygen partial pressure within the sputter deposition vacuum chamber. In FIG. 7, the oxygen partial pressure (OPP) is plotted along the abscissa, the dynamic deposition rate (DDR) along the left hand ordinate and the atomic ratio (AR) along the right hand ordinate. The descending curve comprises the DDR and the ascending curve the AR. The DDR was calculated from two test runs. The AR was determined by Helium Ion Beam Rutherford Back Scattering measurements and Auger Electron Spectroscopy profiles, calibrated against commercial bulk $Bi_2O_3$. For reasons not presently known, Auger profiles have consistently yielded higher AR values than Rutherford Back Scattering measurements, especially at higher AR values. Nevertheless, it is noted as a general observation that as the OPP increases, the AR rises and the film becomes clear when the AR equals or exceeds 1.7.

As graphically portrayed in FIG. 7, $BiO_x$ with an AR of 1.8 may be deposited at an oxygen partial pressure of about 7.5 E-5T ($7.5 \times 10^{-5}$ Torr.) and a DDR of about 3.5 $nm^x$ $cm^{}2/j$ (thickness in nm times area in sq. cm. divided by energy in Joules); and $BiO_x$ with an AR of 2.5 may be produced at an OPP of 12E-5T and a DDR of about 2.5 $nm^x$ $cm^{}2/j$. In contrast, the DDR for reactive sputtering of $TiO_2$ is typically about 0.1 $nm^x cm^{**}2/j$. Thus, the synthetic $BiO_x$ ($x=>1.7$) of the invention may be deposited 25 to 35 times faster than $TiO_2$, a very significant economic advantage.

Figure 8:
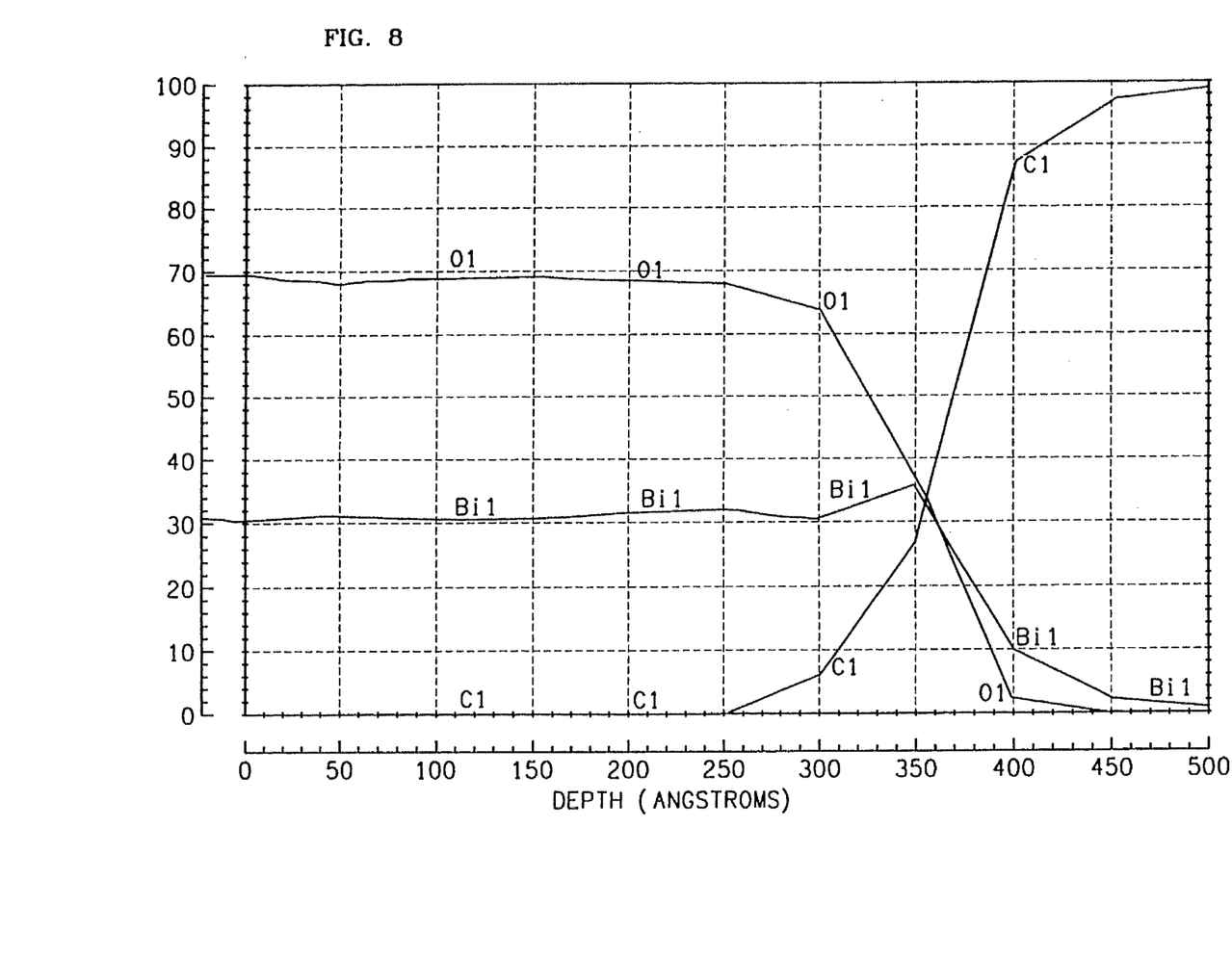
FIG. 8 is an Auger profile of a thin $BiO_x$ coating deposited in accordance with the invention.

As measured by Auger profile, the thin film coating on the substrate is very uniform, as is illustrated in FIG. 8 for a $BiO_x$ film having an AR of about 2.3. Scanning electron microscope (SEM) photographs at a magnification of 50,000 times further reveal that as the OPP is increased to produce a $BiO_x$ film having an AR of 1.7 or greater, the surface of the coating becomes extremely smooth and uniform, thereby significantly reducing absorption and significantly increasing transmission and reflectivity.

Figure 3:
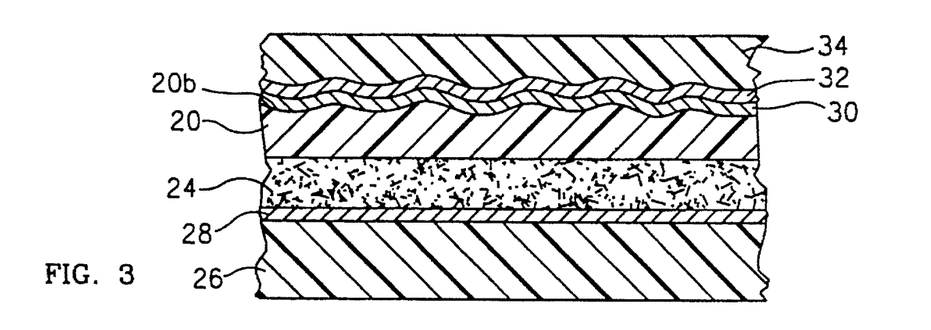
FIG. 3 is a schematic representation of an alternative composite structure comprised of a document secured by an optically variable image device.

Because of the enhanced characteristics thereof, the $BiO_x$ ($x=>1.7$) thin film coatings of the invention also facilitate production of composite holographic products of the structure illustrated in FIG. 3 wherein the holographic image faces away from rather than toward the base material, and wherein the optically variable image relief or interference pattern is protected by a transparent overcoating, such as an acrylate coating. FIG. 3 also illustrates the use of an adhesion promoting or protective prime coat between the relief pattern and the image enhancing film, as well as a protective top coat.

In the structure illustrated in FIG. 3, the composite holographically secured document comprises a substrate 20 adhered by a layer of adhesive 24 to an underlying base material or card 26 having printing or other indicia 28 on its upper surface. The substrate 20 bears an optically variable image relief or interference pattern 20b on its upper surface. Applied over the relief pattern is a thin film prime coat 30 of a transparent adhesion promoting or protective material which exactly duplicates the optically variable relief pattern. An image enhancing layer 32 is in turn applied as a thin film over the prime coat layer 30, the film 32 also exactly duplicating the optically variable relief pattern. A transparent scratch and wear resistant coating 34 overlies and protects the imaging enhancing film and the optically variable imaging surfaces. The protective films 30 and 34 preferably comprise transparent acrylates formed by evaporation and electron beam (E beam) curing of monomers having the general formula where R1 is an aliphatic or alicyclic radical and R2 is hydrogen or methyl, and which have a vapor pressure less than 1 minitorr at room temperature, and a vapor pressure up to 1 to 10 torr at 100 to 300 degrees C. before becoming chemically unstable.

The thickness of an acrylate prime coat 30 may suitably be in the order of from about 100 to 500 nm, and an acrylate top coat 34 may have a thickness from about 1.5 to 5.0 microns.

Figure 4:
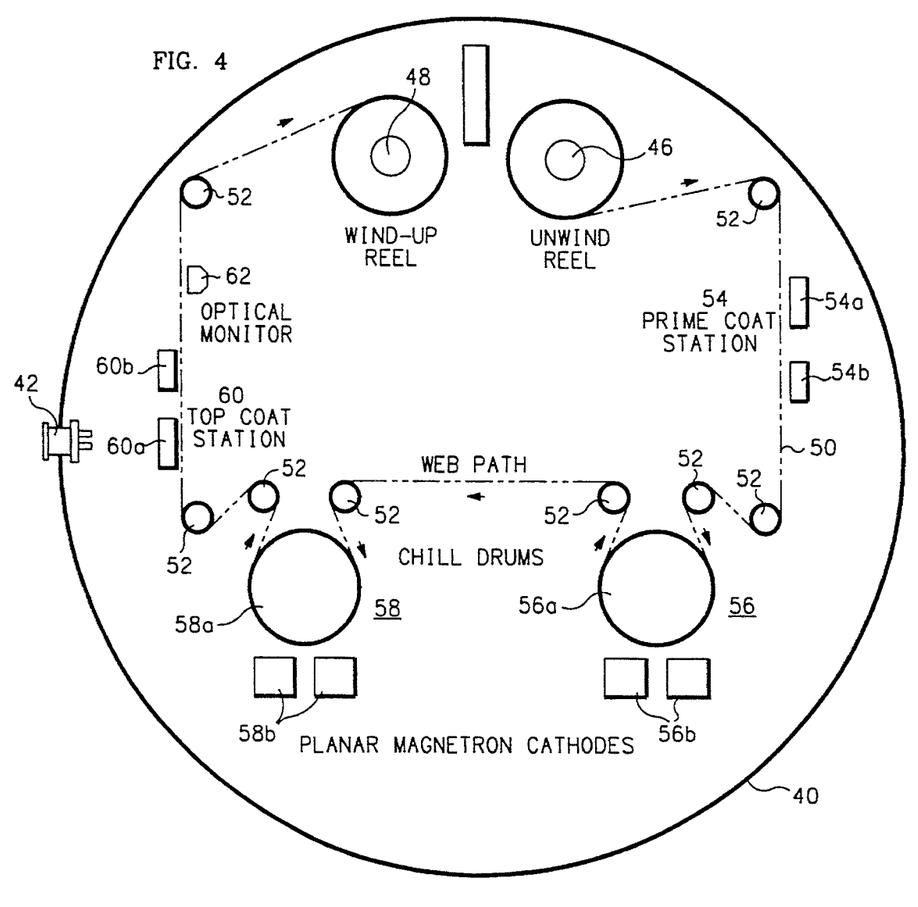
FIG. 4 is a schematic illustration of an apparatus for producing the optically variable image devices of FIGS. 1–3.

Apparatus for producing the visually enhanced holograms of FIGS. 1–3 is illustrated schematically in FIG. 4. The film depositing apparatus is mounted within a vacuum chamber 40 equipped with means (not shown) for evacuating the chamber and means 42 for introducing into the chamber an inert gas and/or a partial pressure reactant, in this case oxygen. The chamber is provided with an unwind reel 46 for receiving a roll of continuous web substrate material intended to be coated and a wind-up reel 48 for winding up the web of substrate material after it has been coated. As indicated by the dot-dash line, the web 50 is guided by a plurality of guide rollers 52 into and through a plurality of web coating stations. In the illustrated form of the apparatus, the coating stations include, in sequence in the direction of web travel, a prime coat station 54, a first deposition station 56, a second deposition station 58, and a top coat station 60.

The web 50 may be embossed or otherwise provided with a holographic relief or interference pattern either separately from or simultaneously with the coating operations. Alternatively, the web may first be coated and then embossed with the relief pattern. In either event, the web is mounted so that the image side of the web faces the coating apparatus as the web passes through each of the stations 54, 56, 58 and 60.

The prime coat station 54 comprises an applicator 54a for evaporating and/or spraying a monomer onto the image side of the web 50, and an E beam apparatus 54b for curing and polymerizing the monomer as the web passes through the station 54.

The top coat station 60 similarly comprises a monomer applicator 60a and an E beam curing apparatus 60b.

The two deposition stations 56 and 58 are preferably sputter deposition stations which are of the same construction and comprise, respectively, an internally chilled rotatable drum 56a, 58a of relatively large diameter for supporting and cooling the web and one or more magnetron cathodes 56b, 58b for sputter depositing the image enhancing film onto the web. Two sputter deposition stations are recommended so as to minimize the discharge requirements at each station, thereby to enhance the speed of the coating operation and minimize heat transfer to the web 50 of substrate material. Also, the space intervening between the two stations provides for a free run of the web so that additional cooling of the web may take place before the web reaches the second sputtering station. In view of the delicacy of many holographic image patterns and the thinness of some substrates, it is further recommended that each sputtering station comprise two magnetrons so that sputter deposition of the image enhancing layer is achieved in four stages or steps each of which is of relatively low dynamic intensity, i.e., two thin coatings (one-two) at the station 56 and two thin coatings (three-four) at the station 58.

For the formation of the optically enhanced holograms of FIGS. 1 and 2, the prime and top coat stations 54 and 60 would not be operated and either one or both of the sputter deposition stations 56 and 58 would be operated to deposit the image enhancing film 12 onto the image side of the substrate. For the formation of the optically enhanced hologram structure of FIG. 4, all four stations would be operated to deposit in sequence on the substrate 20 the prime coat 30, the image enhancing film 32 and the protective top coat 34. Thus, by selective operation of the coating stations, the holographic image side of the web 50 may be coated with just the image enhancing film, or with the image enhancing film and either one or both of a prime coat and a top coat, all in a continuous process in vacuuo.

An optical monitor 62 is provided downstream from the top coat station 60 to monitor the transmittance and the reflectance of the coated film. The monitor preferably scans the film within the spectral range from 350 to 800 nm. One or more optical monitors (not illustrated in FIG. 4.) may also be provided at the sputtering stations, especially when reactively sputtering $BiO_x$ (x=>1.7), to ensure the proper thickness/thinness of the film and the intended extent of oxidation, and to provide information for determining the sufficiency of the oxygen partial pressure while maintaining the optimum sputtering rate. Transmittance/reflectance scanner monitors have been designed by DynOptics of Laguna Hills, Calif., and are operational for the optical measurements. A web drive system (not shown) may then be activated to transport the web past the coating stations at 20 to 50 ft/min., depending upon the film characteristics desired. The whole roll of web material is coated and then removed from the chamber.

In addition to sputter deposition of synthesized high oxygen content oxides of bismuth, the apparatus and method of the invention lend themselves well to the sputter deposition of a variety of materials onto holographic image bearing substrates, particularly for the mass production of the partially transmissive absorbing type of holograms employing thin metal films for image enhancement and one or more resin coatings, e.g., acrylate coatings, for imparting durability to the structure and corrosion resistance for the metal.

Specifically, the apparatus illustrated in FIG. 4 may be operated selectively in accordance with the method above described to apply to the image side of the substrate a one, two or three layer coating thereby to produce a holographic product comprised of substrate/metal, or substrate/metal/ acrylate, or substrate/acrylate/metal, or substrate/acrylate/ metal/acrylate. Due to the fact that the metal and the acrylate are applied in a continuous in-line operation in vacuum, utilizing only an inert gas and no reactive gas, the method eliminates the risk of oxidation or corrosion of the thin metal layer. Consequently, stable, durable, corrosion resistant metallized holographic products can readily be produced at economical mass production speeds.

The metal may be aluminum, silver, copper or mixtures thereof sputter deposited to a thinness providing 30–75% transmission. An alloy comprised of 90–97% silver and 3–10% copper is particularly advantageous and increases durability significantly. Consequently, a preferred material for the metal layer comprises a 92.5/7.5 mixture of silver and copper.

The metal layer is applied at sufficient thinness, e.g., from about 5 to about 25 nm, to exactly duplicate the holographic image on the substrate. Similarly, if an acrylate prime coat is applied (to enhance the adhesion of the metal layer and/or increase the durability of the product), it too is sufficiently thin, e.g., from about 5 to about 50 nm, to exactly duplicate the holographic image. The outer protective acrylate layer can be of such thickness, e.g., from about 1 to 2 microns, as desired for scratch and wear resistance and/or to facilitate bonding to a base card or the like. Suitable acrylate materials have been described above.

The process is carried out continuously on a continuous web of holographic substrate entirely within a vacuum chamber without any intervening exposure to ambient air. The process is performed efficiently and economically at high production speeds and produces a durable, visually transparent hologram having an enhanced image.

The invention thus provides for economical mass production of durable holographic products of improved performance. In particular, the $BiO_x$ (x=>1.7) coated holograms of the invention provide a visually transparent hologram having an extremely bright image.

The objects and advantages of the invention have therefore been shown to be attained in a convenient, economical and practical manner.

While preferred embodiments of the invention have been herein illustrated and described, it is to be appreciated that various changes, rearrangements and modifications may be made therein without departing from the scope of the invention, as defined by the appended claims.

What is claimed is:

1. A process for enhancing the optically variable image of an optically variable image device that is comprised of a substrate having an optically variable relief or interference pattern image bearing side, comprising the step of reactively depositing onto the image bearing side of the substrate a thin film of synthesized high oxygen content oxide of bismuth having an atomic ratio of oxygen to bismuth of 1.7 or greater, said thin film being deposited on the substrate as required before or after formation on the image bearing side of the substrate of the optically variable relief or interference pattern.

2. A process as set forth in claim 1, wherein the thin film has an atomic ratio of oxygen to bismuth of from about 1.8 to about 2.5.

3. A process as set forth in claim 1, wherein the thin film is deposited to a thickness of from about 20 to about 90 nanometers.

4. A process as set forth in claim 1, including the steps of applying to the image bearing side of the substrate a thin film prime coat of polymerizable monomer and polymerizing the same, and then reactively depositing the thin film of synthesized oxide of bismuth onto the prime coat.

5. A process as set forth in claim 1, including the step of applying over the thin film of synthesized oxide of bismuth a protective coating of polymerizable monomer and polymerizing the same.

6. An optically variable image device comprising a substrate having an optically variable relief image pattern on a surface thereof, and a thin film of synthesized high oxygen content oxide of bismuth adhered to and substantially duplicating the image pattern, said thin film having an atomic ratio of oxygen to bismuth of at least 1.7.

7. A device as set forth in claim 6, wherein the thin film has an atomic ratio of oxygen to bismuth of from about 1.8 to about 2.5.

8. A device as set forth in claim 6, wherein the thickness of the thin film is from about 20 to about 90 nanometers.

9. A process for enhancing the optically variable image of a substantially transparent optically variable image device that is comprised of a transparent substrate having an optically variable relief or interference pattern image bearing side, comprising the steps of providing a vacuum chamber for thin film deposition in vacuuo, providing within the vacuum chamber at least one sputter deposition station and at least one station for depositing and curing a resin coating, positioning the substrate within the chamber for movement of the image bearing side thereof relative to the deposition stations, evacuating the chamber, moving the substrate within the evacuated chamber to move the image bearing side thereof sequentially from one station to the other, and in sequence within the evacuated chamber, while continuously maintaining the chamber evacuated, sputter depositing a thin visual light transmitting film of image enhancing material and depositing and curing at least one thin substantially transparent resin coating on the image bearing side of the substrate; and wherein the thin film of image enhancing material comprises $BiO_x$ ($x => 1.7$) and the film is deposited onto the substrate by reacting bismuth with oxygen in a controlled oxygen partial pressure atmosphere and at a dynamic deposition rate such as to form and deposit on the substrate a thin visual light transmitting film of a synthesized high oxygen content oxide of bismuth having an atomic ratio of oxygen to bismuth of 1.7 or greater.

10. A process as set forth in claim 9, wherein the thin resin coating is first deposited onto the image bearing side of the substrate and cured, and the thin film of image enhancing material is sputter deposited over the resin coating.

11. A process as set forth in claim 9, wherein the thin film of image enhancing material is first sputter deposited onto the image bearing side of the substrate and the thin resin coating is then deposited and cured over the thin film of image enhancing material.

12. A process as set forth in claim 9, wherein the thin resin coating is first deposited onto the image bearing side of the substrate and cured, the thin film of image enhancing material is sputter deposited over the resin coating, and a second substantially transparent resin coating is then deposited and cured over the thin film of image enhancing material.

13. A process as set forth in claim 9, including the steps of providing within the vacuum chamber an unwind reel for a roll of web substrate material to be coated, a wind-up reel for winding up the web after coating thereof, and a plurality of rollers for guiding the web from the unwind reel through the deposition stations to the wind-up reel, providing within the vacuum chamber in sequence in the direction of web travel from the unwind reel to the wind-up reel a prime coat station for depositing and curing as a prime coat the thin substantially transparent resin coating, a sputter deposition station for sputter deposition of the thin visual light transmitting film of image enhancing material, and a top coat station for depositing and curing a substantially transparent top coat of resin material, moving the web sequentially through the stations, and selectively operating said stations for depositing on the web a plural layer coating comprising any one of (i) the prime coat and the image enhancing film, (ii) the image enhancing film and the top coat, and (iii) the prime coat, the image enhancing film and the top coat.

14. In a process for enhancing the optically variable image of an optically variable image device that is comprised of a substrate having an optically variable relief or interference pattern image bearing side, the improvement comprising the step of reacting bismuth with oxygen in a controlled oxygen partial pressure atmosphere and at a dynamic deposition rate such as to form and deposit onto the image bearing side of the substrate a thin visual light transmitting film of synthesized high oxygen content oxide of bismuth having an atomic ratio of oxygen to bismuth of 1.7 or greater.

15. In a process for enhancing the optically variable image of an optically variable image device comprising, the steps of first depositing onto a surface of a substrate a thin film coating of synthesized oxide of bismuth having an atomic ratio of oxygen to bismuth of 1.7 or greater, and then forming on the coated surface of the substrate an optically variable relief or interference image pattern.

* * * * *